US012640652B2

(12) United States Patent
Zhang

(10) Patent No.: US 12,640,652 B2
(45) Date of Patent: May 26, 2026

(54) STACKABLE CONTROLLERS FOR MULTIPHASE SWITCHING CONVERTERS AND POWER SUPPLY SYSTEM THEREOF

(71) Applicant: Chengdu Monolithic Power Systems Co., Ltd., Chengdu (CN)

(72) Inventor: Fangyu Zhang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 254 days.

(21) Appl. No.: 18/514,094

(22) Filed: Nov. 20, 2023

(65) Prior Publication Data

US 2024/0186900 A1 Jun. 6, 2024

(30) Foreign Application Priority Data

Dec. 5, 2022 (CN) .......................... 202211551102.3

(51) Int. Cl.
| | |
|---|---|
| *H02M 3/158* | (2006.01) |
| *G05F 1/10* | (2006.01) |
| *H02M 1/00* | (2006.01) |
| *H02M 1/084* | (2006.01) |
| *H02M 3/157* | (2006.01) |

(52) U.S. Cl.
CPC ............ *H02M 3/1584* (2013.01); *G05F 1/10* (2013.01); *H02M 1/0003* (2021.05); *H02M 1/084* (2013.01); *H02M 3/157* (2013.01)

(58) Field of Classification Search
CPC .. H02M 3/1584; H02M 1/0003; H02M 1/084; H02M 3/157; G05F 1/10
See application file for complete search history.

(56) References Cited

U.S. PATENT DOCUMENTS

| | | | |
|---|---|---|---|
| 8,493,044 | B2 | 7/2013 | Xu |
| 9,081,397 | B2 | 7/2015 | Jiang |
| 9,270,178 | B2 | 2/2016 | Jiang |
| 9,407,148 | B2 | 8/2016 | Guo |
| 9,912,240 | B1 | 3/2018 | Nguyen |
| 9,941,781 | B2 | 4/2018 | Hu |
| 10,270,343 | B2 | 4/2019 | Nguyen |
| 10,523,106 | B2 | 12/2019 | Li |
| 10,848,051 | B2 * | 11/2020 | Yan .......................... H02M 1/32 |

(Continued)

OTHER PUBLICATIONS

U.S. Appl. No. 17/700,272, filed Sep. 21, 2023, Yan-Cun Li.

*Primary Examiner* — Adolf D Berhane
(74) *Attorney, Agent, or Firm* — Perkins Coie LLP

(57) ABSTRACT

A power supply system has a first power circuit, a second power circuit, a first controller and a second controller. The first and second power circuits respectively have a first and second plurality of switching circuits coupled in parallel to provide an output voltage. The first controller provides a turn-on control signal at the first turn-on control pin based on a voltage feedback signal received by a first feedback pin, and provides a first plurality of switching control signals at the first plurality of switching control pins based on a turn-on control signal to successively turn ON a first plurality of switching circuits. The second controller provides a second plurality of switching control signals at a second plurality of switching control pins based on the turn-on control signal received by a second turn-on control pin to successively turn ON the second plurality of switching circuits.

19 Claims, 8 Drawing Sheets

(56)  References Cited

U.S. PATENT DOCUMENTS

| | | | | |
|---|---|---|---|---|
| 11,081,954 | B2 | 8/2021 | Jiang | |
| 11,342,848 | B2 * | 5/2022 | Luo | H02M 1/0003 |
| 11,349,383 | B2 | 5/2022 | Jiang | |
| 11,356,023 | B2 | 6/2022 | Jiang | |
| 11,387,736 | B2 | 7/2022 | Luo | |
| 11,515,902 | B2 | 11/2022 | Moon et al. | |
| 11,545,902 | B2 * | 1/2023 | Luo | H02M 3/1584 |
| 11,545,903 | B1 | 1/2023 | Li | |
| 11,750,100 | B2 | 9/2023 | Jiang | |
| 11,811,325 | B2 | 11/2023 | Jiang | |
| 2023/0336082 | A1 * | 10/2023 | Dai | H02M 1/327 |
| 2024/0186901 | A1 * | 6/2024 | Huang | H02M 1/084 |
| 2024/0186902 | A1 * | 6/2024 | Huang | H02M 1/0009 |

* cited by examiner

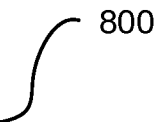

800

| | Providing or receiving a turn-on control signal via a turn-on control pin, when the controller is configured as a master controller, providing the turn-on control signal at the turn-on control pin, and when the controller is configured as a slave controller, receiving the turn-on control signal provided by the master controller at the turn-on control pin |

S11

| | Providing a plurality of switching control signals at a plurality of switching control pins to turn ON the plurality of switching circuits successively |

STACKABLE CONTROLLERS FOR MULTIPHASE SWITCHING CONVERTERS AND POWER SUPPLY SYSTEM THEREOF

CROSS-REFERENCE TO RELATED APPLICATIONS

This application claims the benefit of CN application 202211551102.3, filed on Dec. 5, 2022, and incorporated herein by reference.

BACKGROUND OF THE INVENTION

1. Field of the Invention

The present invention generally relates to electronic circuits, and more particularly, relates to power supply systems, control circuits for voltage regulators and control methods thereof.

2. Description of Related Art

With the development of high performance CPU (Central Processing Unit), switching converters with lower output voltage and higher output current are needed, and requirements for better thermal performance and faster transient response are also increasing. Multiphase switching converters are widely used because of their superior performance. A multiphase switching converter has a plurality of switching circuits, each switching circuit being one phase, and output terminals of all the switching circuits are coupled together to provide an output voltage for a load.

A controller for a multiphase switching converter usually provides an individual switching control signal for each phase. However, if the number of the phases is larger than the number of switching control signals that the controller can provide, then it will be necessary to use one switching control signal to control two or more phases, which may cause new problems.

SUMMARY OF THE INVENTION

It is an object of the present invention to provide a stackable controllers for multiphase switching converters.

Embodiments of the present invention are directed to a power supply system, comprising a first power circuit, a second power circuit, a first controller, and a second controller. The first power circuit has a first plurality of switching circuits, and the second power circuit has a second plurality of switching circuits. Each of the first plurality of switching circuits and the second plurality of switching circuits are coupled in parallel to provide an output voltage. The first controller comprises a first feedback pin, a first turn-on control pin, and a first plurality of switching control pins. The first feedback pin is configured to receive a voltage feedback signal representative of the output voltage. The first controller is configured to provide a turn-on control signal at the first turn-on control pin based on the voltage feedback signal, and is configured to provide a first plurality of switching control signals at the first plurality of switching control pins based on the turn-on control signal to successively turn ON the first plurality of switching circuits. The second controller comprises a second turn-on control pin and a second plurality of switching control pins. The second turn-on control pin is coupled to the first turn-on control pin to receive the turn-on control signal provided by the first controller, and the second controller is configured to provide a second plurality of switching control signals at the second plurality of switching control pins based on the turn-on control signal to successively turn ON the second plurality of switching circuits.

Embodiments of the present invention are directed to a controller for a multiphase switching converter. The multiphase switching converter has a plurality of switching circuits coupled in parallel to provide an output voltage. The controller comprises a turn-on control pin, and a plurality of switching control pins. When the controller is configured as a master controller, the turn-on control pin is configured to provide a turn-on control signal based on the output voltage, and when the controller is configured as a slave controller, the turn-on control pin is configured to receive the turn-on control signal from another controller. The controller is configured to provide a plurality of switching control signals at the plurality of switching control pins to successively turn ON the plurality of switching circuits.

Embodiments of the present invention are directed to control method for a multiphase switching converter. The multiphase switching converter has a controller and a plurality of switching circuits coupled in parallel to provide an output voltage. The control method comprises providing or receiving a turn-on control signal at a turn-on control pin, and providing a plurality of switching control signals at a plurality of switching control pins to turn ON the plurality of switching circuits successively. Wherein when the controller is configured as a master controller, providing the turn-on control signal at the turn-on control pin, and when the controller is configured as a slave controller, receiving the turn-on control signal provided by the master controller at the turn-on control pin.

These and other features of the present invention will be readily apparent to persons of ordinary skill in the art upon reading the entirety of this disclosure, which includes the accompanying drawings and claims.

BRIEF DESCRIPTION OF DRAWINGS

The present invention can be further understood with reference to the following detailed description and the appended drawings, wherein like elements are provided with like reference numerals.

FIG. 8 illustrates a control method 800 for a multiphase switching converter in accordance with an embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
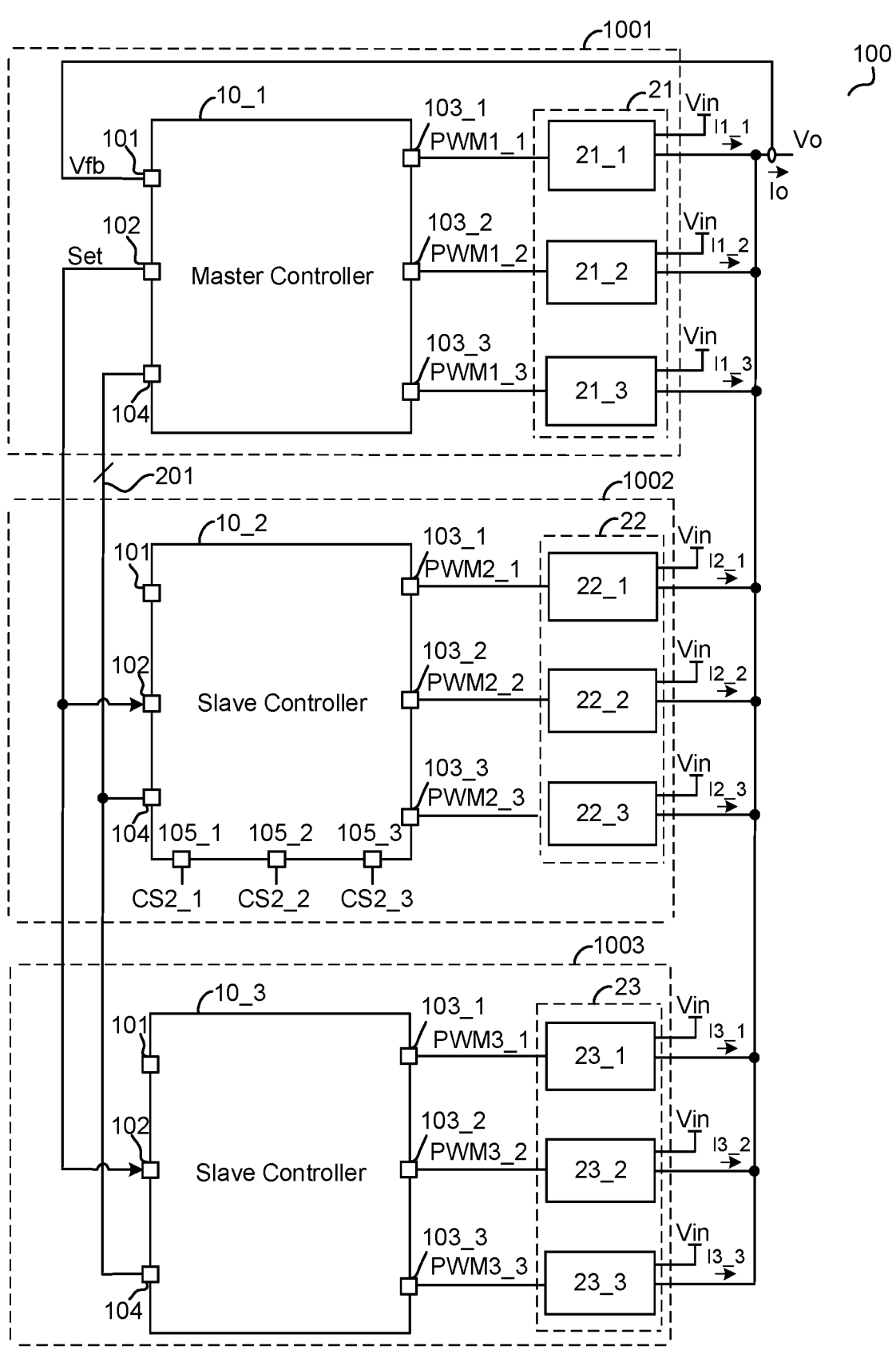
FIG. 1 schematically illustrates a power supply system 100 in accordance with an embodiment of the present invention.

FIG. 1 schematically illustrates a power supply system 100 in accordance with an embodiment of the present invention. The power supply system 100 receives an input voltage Vin, and provides an output voltage Vo and an output current Io. The power supply system 100 has multiphase switching converters 1001, 1002, and 1003. The multiphase switching converter 1001 has a power circuit 21 and a controller 10_1, the multiphase switching converter 1002 has a power circuit 22 and a controller 10_2, and the multiphase switching converter 1003 has a power circuit 23 and a controller 10_3. One with ordinary skill in the art should understand that the power supply system 100 may also comprise a different number of multiphase switching converters. The power circuits 21-23 receives the input voltage Vin, and converts the input voltage Vin to the output voltage Vo. Each of the power circuits 21-23 has a plurality of switching circuits coupled together in parallel to provide the output voltage Vo. In the example of FIG. 1, the power circuit 21 has switching circuits 21_1-21_3 providing currents I1_1-I1_3 respectively, the power circuit 22 has switching circuits 22_1-22_3 providing currents I2_1-I2_3 respectively, and the power circuit 23 has switching circuits 23_1-23_3 providing currents I3_1-I3_3 respectively. In some embodiments, the switching circuits 21_1-21_3, 22_1- 22_3, and 23_1-23_3 may comprise buck circuits, boost circuits or buck-boost circuits, etc. One with ordinary skill in the art should understand that each of the power circuits 21-23 may also have more or fewer than three switching circuits as shown in FIG. 1. Although in the example of FIG. 1, each of the power circuits 21-23 has a same number of switching circuits, one with ordinary skill in the art should understand that, the number of switching circuits in each of the power circuits 21-23 may also be different.

In the example of FIG. 1, each controller 10_i (i=1, 2, 3 in the embodiment of FIG. 1) has a feedback pin 101, a turn-on control pin 102, and a plurality of switching control pins 103 (e.g., control pins 103_1, 103_2, and 103_3 shown in FIG. 1). The controllers 10_1-10_3 are stackable, i.e., the controllers 10_1-10_3 are coupled in parallel via the turn-on control pins 102. In the example of FIG. 1, the controller 10_1 is configured as a master controller, the controllers 10_2 and 10_3 are configured as slave controllers. FIG. 1 is illustrated by employing two slave controllers as one example, and one with ordinary skill in the art should understand that the power supply system 100 may also have different numbers of slave controllers. The feedback pin 101 of the master controller 10_1 receives a voltage feedback signal Vfb representative of the output voltage Vo. The master controller 10_1 provides a turn-on control signal Set at its turn-on control pin 102 based on the voltage feedback signal Vfb, and provides a plurality of switching control signals PWM1 (e.g., control signals PWM1_1, PWM1_2, and PWM1_3 shown in FIG. 1) based on the turn-on control signal Set. The switching control signals PWM1_1, PWM1_2, and PWM1_3 are configured to turn ON the plurality of switching circuits 21_1-21_3 of the power circuit 21 successively. The turn-on control pins 102 of the slave controllers 10_2 and 10_3 are coupled to the turn-on control pin 102 of the master controller 10_1 to receive the turn-on control signal Set provided by the master controller 10_1. The slave controller 10_2 provides a plurality of switching control signals PWM2 (e.g., PWM2_1, PWM2_2, and PWM2_3 shown in FIG. 1) at the plurality of switching control pins 103 of the slave controller 10_2 based on the turn-on control signal Set provided by the master controller 10_1, and the plurality of switching control signals PWM2_1, PWM2_2, and PWM2_3 are configured to turn ON the plurality of switching circuits 22_1-22_3 succes- sively. The slave controller 10_3 provides a plurality of switching control signals PWM3 (e.g., PWM3_1, PWM3_2, and PWM3_3 shown in FIG. 1) at the plurality of switching control pins 103 of the slave controller 10_3 based on the turn-on control signal Set provided by the master controller 10_1, and the plurality of switching control signals PWM3_1, PWM3_2, and PWM3_3 are configured to turn ON the plurality of switching circuits 23_1-23_3 succes- sively. In one embodiment, the feedback pins 101 of the slave controllers 10_2 and 10_3 are not configured to receive the voltage feedback signal Vfb. For example, the feedback pins 101 of the slave controllers 10_2 and 10_3 may be but not be limited to floating as shown in FIG. 1.

In one embodiment, when the voltage feedback signal Vfb received by the master controller 10_1 is smaller than a voltage reference signal Vref, the master controller 10_1 turns ON the at least one switching circuits of the power circuit 21, the slave controller 10_2 turns ON the at least one switching circuits of the power circuit 22, and the slave controller 10_3 turns ON the at least one switching circuits of the power circuit 23. The voltage reference signal Vref represents a desired value of the output voltage Vo.

Embodiments of the present invention provide a power supply system comprising a plurality of controllers coupled in parallel. The power supply system in accordance with the embodiments of the present invention expands the range of the output current, and drives each of the switching circuits by an individual switching control signal, which improves the reliability of the circuit.

In the example of FIG. 1, each controller 10_i further comprises a communication pin 104. The communication pins 104 of all the controllers 10_1-10_3 are coupled together through a communication bus 201 for data-trans- mit, thus data of the master controller 10_1 is synchronized to the slave controllers 10_2-10_3. In one embodiment, the master controller 10_1 transmits data through the commu- nication bus 201 comprises providing a total current data DIsum and a phase current data DIphase, or providing one of the total current data DIsum and the phase current data DIphase. The total current data DIsum indicates a total current (I1_1+I1_2+I1_3) flowing through the power circuit 21, and the phase current data DIphase indicates a current flowing through each of the switching circuits 21_1-21_3 or a current flowing through at least one of the switching circuits 21_1-21_3. In one example, the slave controller 10_2 transmits data through the communication bus 201 comprises receiving the total current data DIsum and the phase current data DIphase, or receiving one of the total current data DIsum and the phase current data DIphase, for regulating a total current (I2_1+I2_2+I2_3) flowing through the power circuit 22, and thus achieving current balance between the power circuit 21 and the power circuit 22. In one example, the slave controller 10_3 transmits data through the communication bus 201 comprises receiving the total current data DIsum and the phase current data DIphase, or receiving one of the total current data DIsum and the phase current data DIphase, for regulating a total current (I3_1+I3_2+I3_3) flowing through the power circuit 23, and thus achieving current balance between the power circuit 21 and the power circuit 23. The embodiments of the present invention can achieve current balance between different power circuits while expanding the range of the output current.

In one example, the master controller 10_1 transmits data through the communication bus 201 further comprises providing a preset ON time data DTON through the communication bus 201, and the slave controllers 10_2 and 10_3 transmit data through the communication bus 201 further comprise receiving the preset ON time data DTON provided by the master controller 10_1 through the communication bus 201. The preset ON time data DTON controls initial ON time periods of the plurality of switching circuits of the power circuits 21-23 equal to each other, thus initial output voltages and initial output currents of the power circuits 21-23 are synchronized. In one embodiment, the master controller 10_1 provides the preset ON time data DTON based on the input voltage Vin and the output voltage Vo (or the desired value of the output voltage Vo) to control the initial ON time period of each switching circuit of the power circuits 21-23 to vary with the input voltage Vin and the output voltage Vo (or the desired value of the output voltage Vo), and thus ensuring a switching frequency of each switching circuit of the power circuits 21-23 to remain substantially stable when the input voltage Vin or the output voltage Vo varies. In one example, data transmitted between the master controller 10_1 and the slave controllers 10_2-10_3 may further comprise but not be limited to a desired frequency data representative of a desired switching frequency, a protection data representative of a circuit protection status. For example, the circuit protection status may comprise but not be limited to over voltage, under voltage, over current, and over temperature, etc.

Figure 2:
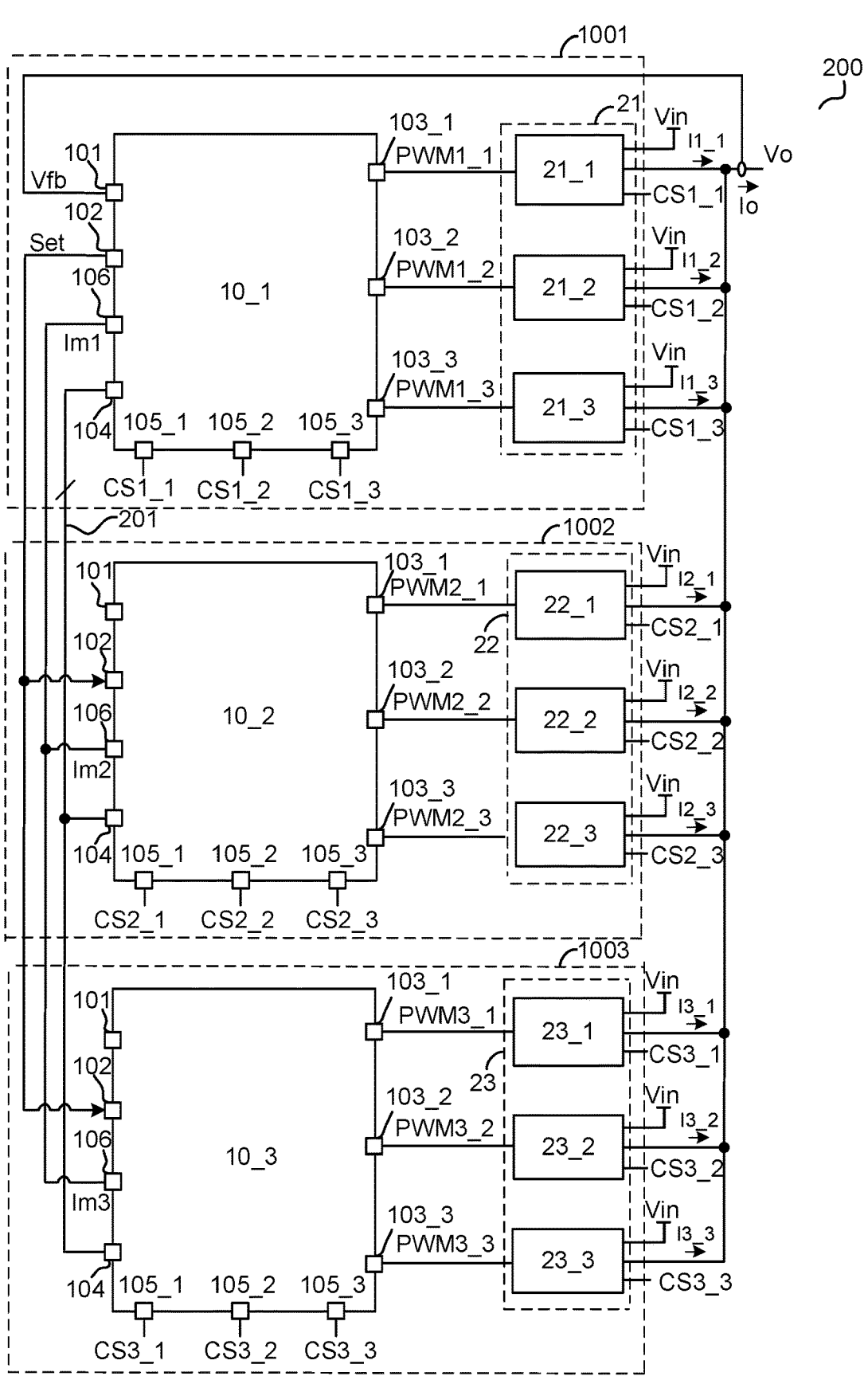
FIG. 2 schematically illustrates a power supply system 200 in accordance with an embodiment of the present invention.

FIG. 2 schematically illustrates a power supply system 200 in accordance with an embodiment of the present invention. In the example of FIG. 2, each controller 10_i (i=1, 2, 3 in the embodiment of FIG. 2) further comprises current sense pins 105_1-105_3 to receive current sense signals CSi_1-CSi_3. The current sense signals CSi_1-CSi_3 represent currents Ii_1-Ii_3 flowing through the switching circuits 2i_1-2i_3 respectively. As shown in FIG. 2, the current sense pins 105_1-105_3 of the master controller 10_1 receive the current sense signals CS1_1-CS1_3 respectively, the current sense pins 105_1-105_3 of the slave controller 10_2 receive the current sense signals CS2_1-CS2_3 respectively, and the current sense pins 105_1-105_3 of the slave controller 10_3 receive the current sense signals CS3_1-CS3_3 respectively. In the example of FIG. 2, each controller 10_i further comprises a total current pin 106. The total current pins 106 of all the controllers 10_1-10_3 are coupled together. The master controller 10_1 provides a total current sense signal Im1 representative of a total current flowing through the switching circuits 21_1-21_3 based on the current sense signals CS1_1-CS1_3. The slave controller 10_2 provides a total current sense signal Im2 representative of the total current flowing through the switching circuits 22_1-22_3 at its total current pin 106 based on the current sense signals CS2_1-CS2_3. The slave controller 10_3 provides a total current sense signal Im3 representative of the total current flowing through the switching circuits 23_1-23_3 at its total current pin 106 based on the current sense signals CS3_1-CS3_3. In one embodiment, the master controller 10_1 provides a system current signal Imon representative of a total current flowing through all the power circuits 21-23 based on the total current sense signals Im1-Im3.

Figure 3:
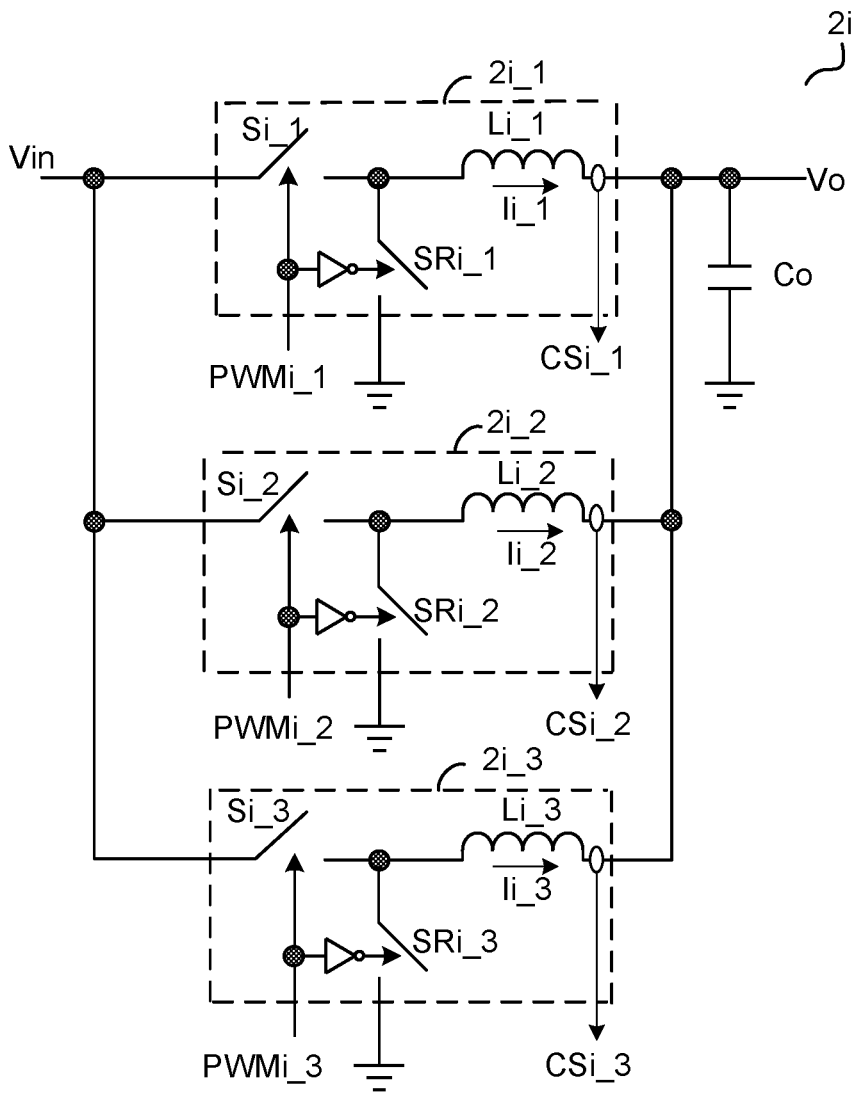
FIG. 3 schematically illustrates a power circuit 2$i$ in accordance with an embodiment of the present invention.

FIG. 3 schematically illustrates a power circuit 2i in accordance with an embodiment of the present invention. In the example of FIG. 3, the switching circuits 2i_1-2i_3 employ buck topology. Each switching circuit 2i_j comprises a switch Si_j, a switch SRi_j and an inductor Li_j (j=1, 2, 3 in the embodiment of FIG. 3) which are connected as shown in FIG. 3. Each switching circuit 2i_j converts the input voltage Vin to the output voltage Vo and provides a current Ii_j under the switching action of the switches Si_j and SRi_j. The switches Si_j and SRi_j are turned ON and OFF complementarily under the control of the switching control signal PWMi_j. The current sense signal CSi_j represents the current Ii_j flowing through the switching circuit 2i_j. For example, the current sense signal CSi_j may be provided by sensing a current flowing through the inductor Li_j, a current flowing through the switch Si_j, or a current flowing through the switch SRi_j.

Figure 4:
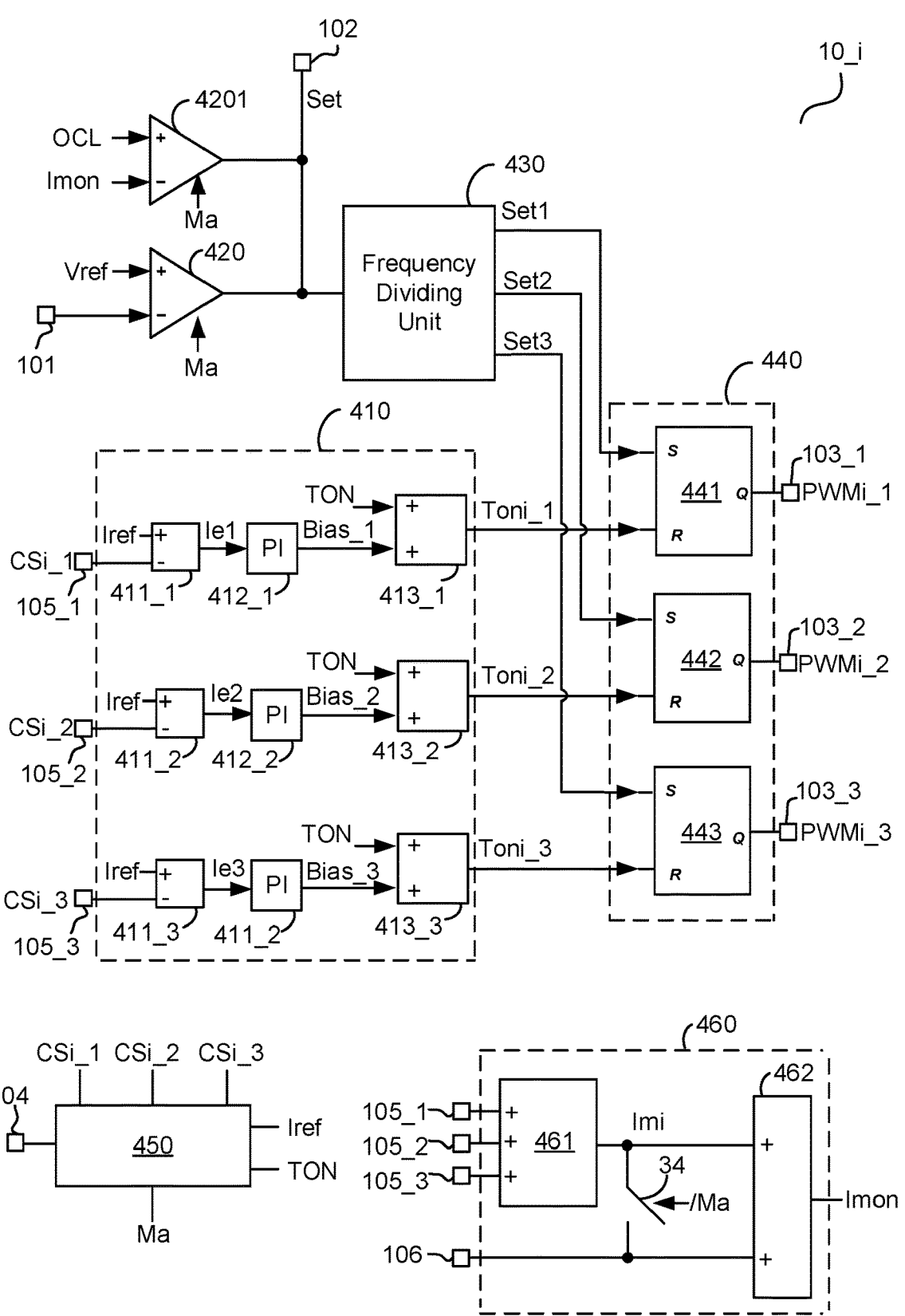
FIG. 4 schematically illustrates a controller 10_$i$ in accordance with an embodiment of the present invention.

FIG. 4 schematically illustrates a controller 10_i in accordance with an embodiment of the present invention. FIG. 4 takes constant ON time control as one example, and one with ordinary skill in the art should understand that any other suitable control scheme may also be employed without detracting merits of the present invention. In the example of FIG. 4, the controller 10_i comprises a current balance unit 410, a comparison unit 420, comparison unit 420a frequency dividing unit 430, and a switch signal generating unit 440. One with ordinary skill in the art should understand that the detailed circuit of the controller 10_i is not limited by the example of FIG. 4.

The current balance unit 410 provides bias signals Bias_1-Bias_3 respectively based on differences between the current sense signals CSi_1-CSi_3 and a current reference signal Iref (i.e., CSi_1-Iref, CSi_2-Iref, and CSi_3-Iref), and the bias signals Bias_1-Bias_3 are configured to regulate ON time periods of the plurality of switching circuits 2i_1-2i_3. The current balance unit 410 provides ON time thresholds Toni_1-Toni_3 via regulating a preset ON time threshold TON, to regulate the ON time periods of the plurality of switching circuits 2i_1-2i_3 of the power circuit 2i. For example, the ON time threshold Toni_1 is provided based on a sum of the bias signal Bias_1 and the preset ON time threshold TON (Bias_1+TON), the ON time threshold Toni_2 is provided based on a sum of the bias signal Bias_2 and the preset ON time threshold TON (Bias_2+TON), and the ON time threshold Toni_3 is provided based on a sum of the bias signal Bias_3 and the preset ON time threshold TON (Bias_3+TON). In one embodiment, the preset ON time threshold TON is generated based on the preset ON time data DTON. In the example of FIG. 4, the current balance unit 410 has subtractors 411_1-411_3, proportional integrators 412_1-412_3, and adders 413_1-413_3. Each subtractor 411_j has a first input terminal, a second input terminal, and an output terminal. The first input terminal of each subtractor 411_j receives the current reference signal Iref, the second input terminal of each subtractor $411\_j$ receives the corresponding current sense signal CSi_j, and the subtractor $411\_j$ provides a current error signal Iej representative of a difference between the current reference signal Iref and the current sense signal CSi_j. Each proportional integrator $412\_j$ has an input terminal and an output terminal. The input terminal of each proportional integrator $412\_j$ is coupled to the output terminal of the corresponding subtractor $411\_j$ to receive the current error signal Iej, and the proportional integrator $412\_j$ provides the bias signal bias_j at its output terminal by performing proportion and integration of the current error signal Iej. Each adder $414\_j$ has a first input terminal, a second input terminal, and an output terminal. The first input terminal of each adder $414\_j$ receives the preset ON time threshold TON, the second input terminal is coupled to the output terminal of the corresponding proportional integrator $412\_j$ to receive the bias signal bias_j, and the adder $414\_j$ provides the ON time threshold Toni j after regulation at its output terminal by adding the preset ON time threshold TON and the bias signal bias_j.

When the controller $10\_i$ is configured as the master controller, the feedback pin 101 receives the voltage feedback signal Vfb, the comparison unit 420 provides the turn-on control signal Set based on the voltage feedback signal Vfb and the voltage reference signal Vref. When the controller $10\_i$ is configured as the slave controller, the comparison unit 420 is disabled, e.g., the comparison unit 420 is disabled by a master-slave indication signal Ma, wherein the master-slave indication signal Ma is configured to indicate whether the controller $10\_i$ is the master controller or the slave controller. In one example, the master-slave indication signal Ma may be a programmable signal, e.g., the master-slave indication signal Ma may be set by a digit of a register, by a pin, or by any other suitable methods. In one embodiment, when the voltage feedback signal Vfb received by the master controller is smaller than the voltage reference signal Vref, the turn-on control signal Set is flipped (e.g., becomes logic high) to turn ON the at least one switching circuits of the power circuit 21, the at least one switching circuits of the power circuit 22, and the at least one switching circuits of the power circuit 23. In one embodiment, when the controller $10\_i$ is configured as the master controller, the controller $10\_i$ provides the turn-on control signal Set further based on a signal on the total current pin 106. For example, the controller $10\_i$ provides the system current signal Imon based on the signal on the total current pin 106, and further provides the turn-on control signal Set based on the system current signal Imon. As shown in FIG. 4, the master controller provides the turn-on control signal Set further based on a comparison result of the system current signal Imon and a max current threshold OCL, wherein the comparison result is provided by a comparison unit 4201. When the controller $10\_i$ is configured as the slave controller, the comparison unit 4201 is disabled. In one embodiment, when the voltage feedback signal Vfb received by the master controller $10\_1$ is smaller than the voltage reference signal Vref and the system current signal Imon is smaller than the max current threshold OCL, the turn-on control signal Set is flipped (e.g., becomes logic high) to turn ON the at least one switching circuits of the power circuit 21, the at least one switching circuits of the power circuit 22, and the at least one switching circuits of the power circuit 23.

The frequency dividing unit 430 receives the turn-on control signal Set provided by the master controller, and distributes pulses of the turn-on control signal Set to a plurality of frequency division signals Set1-Set3. The switch signal generating unit 440 is coupled to the frequency dividing unit 430 to receive the plurality of frequency division signals Set1-Set3, and is coupled to the current balance unit 410 to receive the plurality of ON time thresholds Toni_1-Toni_3. The switch signal generating unit 440 provides a plurality of switching control signals PWMi_1-PWMi_3 based on the plurality of frequency division signals Set1-Set3 and the plurality of ON time thresholds Toni_1-Toni_3 to turn ON and OFF the plurality of switching circuits $2i\_1$-$2i\_3$ of the power circuit $2i$. In one embodiment, the switch signal generating unit 440 turns ON the switching circuits $2i\_1$-$2i\_3$ of the power circuit $2i$ correspondingly based on the frequency division signals Set1-Set3, and turns OFF the switching circuits $2i\_1$-$2i\_3$ of the power circuit $2i$ correspondingly based on the ON time thresholds Toni_1-Toni_3. In the example of FIG. 4, the switch signal generating unit 440 comprises a plurality of RS flip-flops 441-443. The RS flip-flop 441 has a set terminal S, a reset terminal R, and an output terminal Q. The set terminal S of the RS flip-flop 441 receives the frequency division signal Set1, the reset terminal R of the RS flip-flop 441 receives the ON time threshold Toni_1, and the output terminal Q of the RS flip-flop 441 provides the switching control signal PWMi_1 based on the frequency division signal Set1 and the ON time threshold Toni_1 to control the switching circuit $2i\_1$. The RS flip-flop 442 has a set terminal S, a reset terminal R, and an output terminal Q. The set terminal S of the RS flip-flop 442 receives the frequency division signal Set2, the reset terminal R of the RS flip-flop 442 receives the ON time threshold Toni_2, and the output terminal Q of the RS flip-flop 442 provides the switching control signal PWMi_2 based on the frequency division signal Set2 and the ON time threshold Toni_2 to control the switching circuit $2i\_2$. The RS flip-flop 443 has a set terminal S, a reset terminal R, and an output terminal Q. The set terminal S of the RS flip-flop 443 receives the frequency division signal Set3, the reset terminal R of the RS flip-flop 443 receives the ON time threshold Toni_3, and the output terminal Q of the RS flip-flop 443 provides the switching control signal PWMi_3 based on the frequency division signal Set3 and the ON time threshold Toni_3 to control the switching circuit $2i\_3$.

In one embodiment, the controller $10\_i$ further comprises an interface unit 450 coupled to the communication pin 104. When the controller $10\_i$ is configured as the master controller, the interface unit 450 converts a sum of the current sense signals CS1_1-CS1_3 (CS1_1+CS1_2+CS1_3) to the total current data DIsum which represents the total current (I1_1+I1_2+I1_3) flowing through the power circuit 21, and converts the current sense signals CS1_1-CS1_3 or one of the current sense signals CS1_1-CS1_3 to the phase current data DIphase which represents the current flowing through each of the switching circuits 21_1-21_3 or the current flowing through one of the switching circuits 21_1-21_3. The interface unit 450 provides the total current data DIsum and the phase current data DIphase, or provides one of the total current data DIsum and the phase current data DIphase to the slave controllers. In one embodiment, when the controller $10\_i$ is configured as a slave controller, the interface unit 450 provides the current reference signal Iref based on the total current data DIsum or the phase current data DIphase. For example, the interface unit 450 provides the current reference signal Iref by performing digital to analog conversion on the total current data DIsum or the phase current data DIphase. In one embodiment, when the controller $10\_i$ is configured as the master controller, the interface unit 450 provides the current reference signal Iref based on the sum of the current sense signals CS1_1-CS1_3 (CS1_1+CS1_2+CS1_3), the current sense signals CS1_1-CS1_3, or one of the current sense signals CS1_1-CS1_3. In one embodiment, when the controller 10_*i* is configured as the master controller, the interface unit 450 further converts the preset ON time threshold TON to the preset ON time data DTON, and provides the preset ON time data DTON at the communication pin 104. In one embodiment, when the controller 10_*i* is configured as the slave controller, the interface unit 450 further receives the preset ON time data DTON provided by the master controller, and provides the preset ON time threshold TON based on the preset ON time data DTON.

In one embodiment, the controller 10_*i* further comprises a total current processing unit 460 coupled to the total current pin 106 and the current sense pins 105_1-105_3. The total current processing unit 460 provides the total current sense signal Imi representative of the total current flowing through the plurality of switching circuits 2_*i*_1-2_*i*_3 of the corresponding power circuit 2_*i* based on the current sense signals CS_*i*_1-CS_*i*_3. For example, the total current sense signal Imi is equal to the sum of the current sense signals CS1_1-CS1_3 (CS1_1+CS1_2+CS1_3). When the controller 10_*i* is configured as the master controller, the total current processing unit 460 provides the system current signal Imon representative of the total current flowing through all the power circuits 21-23. In one example, the system current signal Imon is equal to a sum of all the total current sense signals Im1-Im3 (Im1+Im2+Im3). In the example of FIG. 4, the total current processing unit 460 comprises calculation units 461-462 and a switch 34. The calculation unit 461 is coupled to the current sense pins 105_1-105_3, and provides the total current sense signals Imi based on the sum of the current sense signals CS1_1-CS1_3 (CS1_1+CS1_2+CS1_3). When the controller 10_*i* is configured as the slave controller, the switch 34 is turned ON, and the slave controller provides the total current sense signals Imi at the total current pin 106. When the controller 10_*i* is configured as the master controller, the switch 34 is turned OFF, and the calculation unit 462 provides the system current signal Imon based on the sum of all the total current sense signals Im1-Im3 (Im1+Im2+Im3).

Figure 5:
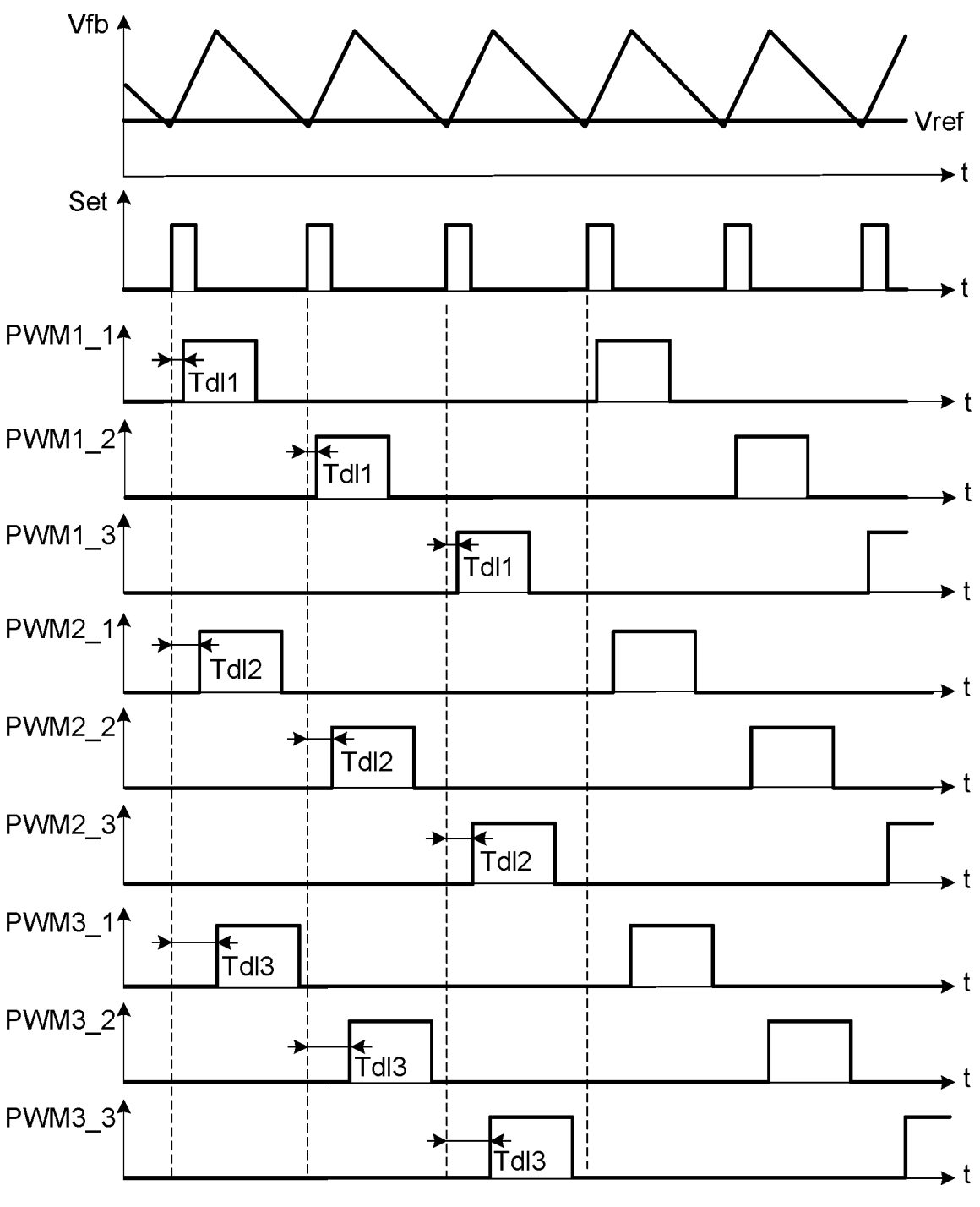
FIG. 5 schematically shows a timing diagram of signals of the power supply system 100 in accordance with an embodiment of the present invention.

FIG. 5 schematically shows a timing diagram of signals of the power supply system 100 in accordance with an embodiment of the present invention. FIG. 5 shows, from top to bottom, the voltage feedback signal Vfb, the turn-on control signal Set, the switching control signals PWM1_1-PWM1_3, the switching control signals PWM2_1-PWM2_3, and the switching control signals PWM3_1-PWM3_3. When the voltage feedback signal Vfb is smaller than the voltage reference signal Vref, the master controller 10_1 is configured to control the turn-on control signal Set flipped (e.g., becomes logic high). One with ordinary skill in the art should understand that pattern of the voltage reference signal Vref is not limited by the example of FIG. 5. For example, a ramp signal may also be added to the voltage reference signal Vref. The master controller 10_1 provides the switching control signals PWM1_1-PWM1_3 based on the turn-on control signal Set to turn ON the plurality of switching circuits 21_1-21_3 successively, the slave controller 10_2 provides the switching control signals PWM2_1-PWM2_3 based on the turn-on control signal Set to turn ON the plurality of switching circuits 22_1-22_3 successively, and the slave controller 10_3 provides the switching control signals PWM3_1-PWM3_3 based on the turn-on control signal Set to turn ON the plurality of switching circuits 23_1-23_3 successively. A delay time period Tdl1 represents a time period from the turn-on control signal Set becoming logic high to one of the switching control signals PWM1_1-PWM1_3 becoming logic high. For example, the delay time period Tdl1 may comprise an internal logic delay, or a computational delay, etc. A delay time period Tdl2 represents a time period from when the turn-on control signal Set becomes logic high to one of the switching control signals PWM2_1-PWM2_3 becoming logic high. A delay time period Tdl3 represents a time period from when the turn-on control signal Set becomes logic high to one of the switching control signals PWM3_1-PWM3_3 becoming logic high. For example, the delay time periods Tdl2-Tdl3 may comprise internal logic delays, computational delays, or propagation delays caused by line transmission between the controllers, etc. One with ordinary skill in the art should understand that lengths of the delay time periods Tdl1-Tdl3 are not limited by the example of FIG. 5.

Figure 6:
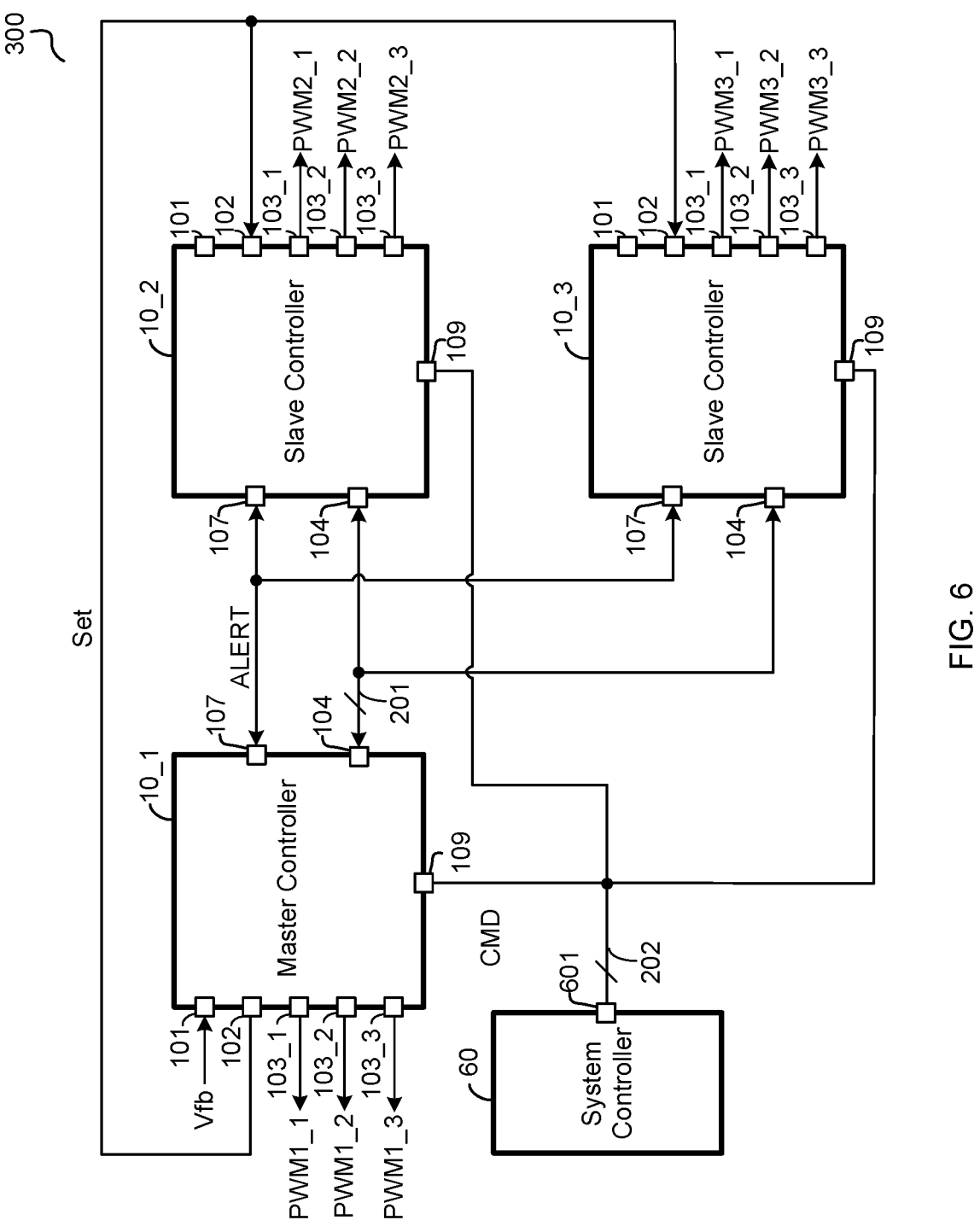
FIG. 6 schematically illustrates a power supply system 300 in accordance with an embodiment of the present invention.

FIG. 6 schematically illustrates a power supply system 300 in accordance with an embodiment of the present invention. The power circuits of the power supply system 300 (e.g., the power circuit 21 controlled by the switching control signals PWM1_1-PWM1_3, the power circuit 22 controlled by the switching control signals PWM2_1-PWM2_3, and the power circuit 23 controlled by the switching control signals PWM3_1-PWM3_3 as shown in FIG. 2) are omitted for illustration purpose. In one embodiment, each controller 10_*i* (*i*=1, 2, 3 in the embodiment of FIG. 6) further comprises an alert pin 107, and the alert pins 107 of all the controllers 10_1-10_3 are coupled together. When any controller 10_*i* is in a fault condition, the controller 10_*i* in the fault condition is configured to indicate the fault condition at its alert pin 107, e.g., the alert pin 107 is set to be logic high or set to be logic low, and all power circuits 21-23 are turned off by the controllers 10_1-10_3. In one embodiment, each controller 10_*i* further comprises a communication pin 109. In the example of FIG. 6, the communication pins 109 of all the controllers 10_1-10_3 are coupled to a communication pin 601 of a system controller 60 through a communication bus 202 to receive a system control command CMD from the system controller 60. The system control command CMD controls circuit parameters of each power circuit 2_*i*, e.g., the output voltage Vo, the desired switching frequency, the initial ON time period, a max current limit of the power supply system 200, a phase current protection limit, a temperature protection limit, and an under voltage protection limit, etc.

Figure 7:
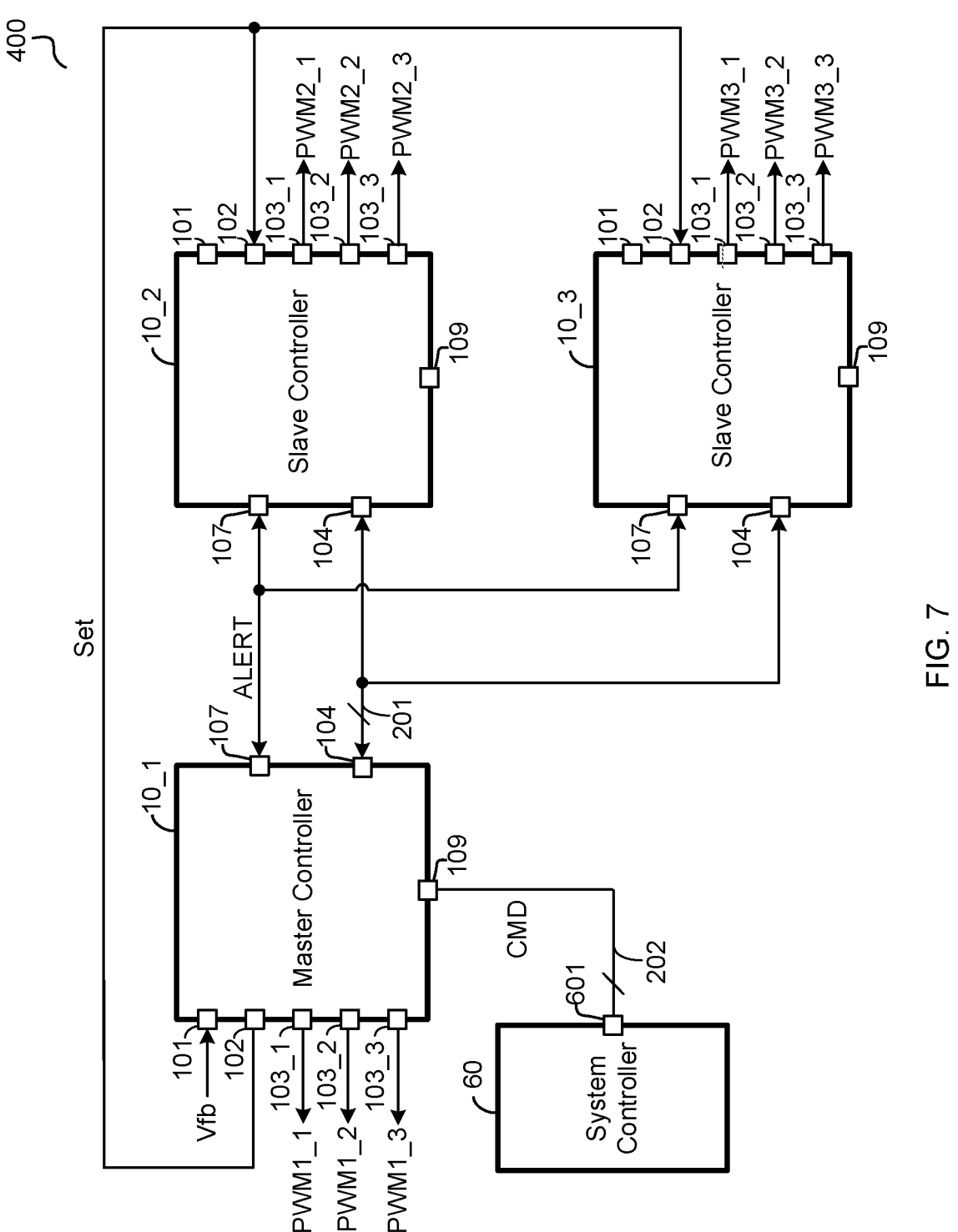
FIG. 7 schematically illustrates a power supply system 400 in accordance with an embodiment of the present invention.

FIG. 7 schematically illustrates a power supply system 400 in accordance with an embodiment of the present invention. The power circuits of the power supply system 400 (e.g., the power circuit 21 controlled by the switching control signals PWM1_1-PWM1_3, the power circuit 22 controlled by the switching control signals PWM2_1-PWM2_3, and the power circuit 23 controlled by the switching control signals PWM3_1-PWM3_3 as shown in FIG. 2) are omitted for illustration purpose. In the example of FIG. 7, the communication pin 109 of the master controller 10_1 is coupled to a communication pin 601 of the system controller 60 through the communication bus 202 to receive the system control command CMD from the system controller 60, and the master controller 10_1 controls the circuit parameters of the power circuit 21 based on the system control command CMD. The master controller 10_1 provides data to the slave controllers 10_2-10_3 through the communication bus 201 to control the circuit parameters of the power circuits 22-23.

FIG. 8 illustrates a control method 800 for a multiphase switching converter in accordance with an embodiment of the present invention. The control method 800 comprises steps S11-S12. The multiphase switching converter has a controller and a plurality of switching circuits coupled together in parallel to provide an output voltage.

In step S11, providing or receiving a turn-on control signal via a turn-on control pin. When the controller is configured as a master controller, providing the turn-on control signal at the turn-on control pin, and when the controller is configured as a slave controller, receiving the turn-on control signal provided by the master controller at the turn-on control pin.

In step S12, providing a plurality of switching control signals at a plurality of switching control pins to turn ON the plurality of switching circuits successively.

In one embodiment, the control method for the multiphase switching converter further comprises coupling the controller to one or more other controllers through a first communication bus, and transmitting data between the controllers to synchronize information between the controllers, and coupling the controller to a system controller through a second communication bus, and receiving a system control command from the system controller to control circuit parameters of the multiphase switching converter. In one embodiment, when the controller is configured as the master controller, transmitting the data comprises providing a total current data and a phase current data through the first communication bus, or providing one of the total current data and the phase current data through the first communication bus. Wherein the total current data represents a total current flowing through the plurality of switching circuits, and the phase current data represents a current flowing through at least one of the switching circuits. In one embodiment, when the controller is configured as the slave controller, transmitting the data comprises receiving the total current data and the phase current data through the first communication bus, or receiving one of the total current data and the phase current data through the first communication bus, to regulate the total current flowing through the plurality of switching circuits controlled by the slave controller. Wherein the total current data represents the total current flowing through the plurality of switching circuits controlled by the master controller, and the phase current data represents the current flowing through at least one of the switching circuits controlled by the master controller. In one embodiment, when the controller is configured as the master controller, transmitting the data further comprises providing a preset ON time data through the first communication bus. In one embodiment, when the controller is configured as the slave controller, transmitting the data further comprises receiving the preset ON time data provided by the master controller through the first communication bus to configure an initial ON time period of each of the plurality of switching circuits controlled by the slave controller, such that the initial ON time periods of the plurality of switching circuits controlled by the slave controller are equal to the initial ON time periods of the plurality of switching circuits controlled by the master controller.

In one embodiment, the control method for the multiphase switching converter further comprises receiving a plurality of current sense signals representative of the current flowing through the plurality of switching circuits via a plurality of current sense pins, and coupling the total current pin to one or more other controllers, when the controller is configured as the slave controller, further providing a total current sense signal representative of the total current flowing through the plurality of switching circuits at a total current pin of the slave controller based on the plurality of current sense signals. When the controller is configured as the master controller, further providing the turn-on control signal based on the signal on the total current pin of the master controller.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A power supply system, comprising:
a first power circuit having a first plurality of switching circuits, and a second power circuit having a second plurality of switching circuits, wherein each of the first plurality of switching circuits and the second plurality of switching circuits are coupled in parallel to provide an output voltage;
a first controller, comprising a first feedback pin, a first turn-on control pin, and a first plurality of switching control pins, wherein the first feedback pin is configured to receive a voltage feedback signal representative of the output voltage, the first controller is configured to provide a turn-on control signal at the first turn-on control pin based on the voltage feedback signal, and is configured to provide a first plurality of switching control signals at the first plurality of switching control pins based on the turn-on control signal to successively turn ON the first plurality of switching circuits; and
a second controller, comprising a second turn-on control pin and a second plurality of switching control pins, wherein the second turn-on control pin is coupled to the first turn-on control pin to receive the turn-on control signal provided by the first controller, and the second controller is configured to provide a second plurality of switching control signals at the second plurality of switching control pins based on the turn-on control signal to successively turn ON the second plurality of switching circuits; wherein
when a voltage feedback signal received by the first controller is smaller than a voltage reference signal, the first controller is configured to turn ON at least one of the first plurality of switching circuits, and the second controller is configured to turn ON at least one of the second plurality of switching circuits.

2. The power supply system of claim 1, wherein:
the first controller further comprises a first communication pin, and the first controller is configured to provide a first data via the first communication pin, wherein the first data indicates a total current flowing through the first power circuit or a current flowing through at least one of the first plurality of switching circuits; and
the second controller further comprises a second communication pin coupled to the first communication pin, wherein the second controller is configured to receive the first data from the first controller via the second communication pin, to regulate a total current flowing through the second power circuit.

3. The power supply system of claim 2, wherein:

the first controller is further configured to provide a second data, and the second controller is further configured to receive the second data via the second communication pin to control an initial ON time period of each of the second plurality of switching circuits equal to the initial ON time period of each of the first plurality of switching circuits.

4. The power supply system of claim 2, wherein:

the first controller further comprises a third communication pin, wherein the third communication pin is configured to receive a system control command provided by a system controller to control circuit parameters of the first power circuit; and the first controller is further configured to provide a third data to the second controller based on the system control command to control circuit parameters of the second power circuit.

5. The power supply system of claim 1, wherein:

the first controller further comprises a first total current pin and a first plurality of current sense pins to receive a first plurality of current sense signals, and the first controller is further configured to provide a first total current sense signal representative of a total current flowing through the first plurality of switching circuits, wherein the first plurality of current sense signals represents a plurality of currents flowing through the first plurality of switching circuits;

the second controller further comprises a second total current pin and a second plurality of current sense pins to receive a second plurality of current sense signals, the second total current pin is coupled to the first total current pin, and the second controller is further configured to provide a second total current sense signal representative of a total current flowing through the second plurality of switching circuits, wherein the second plurality of current sense signals represents a plurality of currents flowing through the second plurality of switching circuits; and the first controller is configured to provide the turn-on control signal further based on the first total current sense signal and the second total current sense signal.

6. A controller for a multiphase switching converter, the controller comprising:

a turn-on control pin configured to provide or receive a turn-on control signal which is generated based on an output voltage of the multiphase switching converter; and a plurality of switching control pins, wherein the controller is configured to provide a plurality of switching control signals at the plurality of switching control pins based on the turn-on control signal to successively turn ON a first plurality of switching circuits which are coupled in parallel to provide the output voltage; wherein when a voltage feedback signal representative of the output voltage is smaller than a voltage reference signal, the turn-on control signal is asserted to turn on at least one of the first plurality of switching circuits and at least one of a second plurality of switching circuits of an additional switching converter, wherein the second plurality of switching circuits are coupled in parallel with the first plurality of switching circuits to provide the output voltage.

7. The controller of claim 6, further comprising:

a first communication pin configured to synchronize information with the additional switching converter through a first communication bus; and a second communication pin, capable of coupling to a system controller through a second communication bus to receive a system control command from the system controller to control at least one circuit parameter of the multiphase switching converter.

8. The controller of claim 7, wherein the controller is further configured to provide a first data to the additional switching converter via the first communication pin, wherein the first data indicates currents flowing through the first plurality of switching circuits.

9. The controller of claim 7, wherein the controller is further configured to receive a first data via the first communication pin to regulate a total current flowing through the first plurality of switching circuits, wherein the first data indicates currents flowing through the second plurality of switching circuits.

10. The controller of claim 7, wherein:

the controller is further configured to provide or receive a second data via the first communication pin, to set an initial ON time period of each of the first plurality of switching circuits and each of the second plurality of switching circuits.

11. The controller of claim 6, further comprising:

a plurality of current sense pins, configured to receive a plurality of current sense signals representative of a plurality of currents flowing through the first plurality of switching circuits; and a total current pin capable of being coupled to the additional switching converter to share a total current sense signal representative of a total current flowing through the first plurality of switching circuits based on the plurality of current sense signals.

12. The controller of claim 6, further comprising:

a first communication pin configured to provide or receive a first data, through a first communication bus wherein the first data indicates currents flowing through the first plurality of switching circuits or currents flowing through the second plurality of switching circuits.

13. The controller of claim 12, further comprising:

a current balance unit, configured to regulate ON time periods of the first plurality of switching circuits respectively based on differences between the current sense signals and a current reference signal, wherein the current reference signal is provided based on the first data.

14. A control method for a multiphase switching converter, the control method comprising:

providing or receiving a turn-on control signal; and providing a plurality of switching control signals based on the turn-on control signal to turn ON a first plurality of switching circuits of the multiphase switching converter successively; wherein when a voltage feedback signal representative of an output voltage of the multiphase switching converter is smaller than a voltage reference signal, the turn-on control signal is asserted to turn on at least one of the first plurality of switching circuits and at least one of a second plurality of switching circuits of an additional switching converter, wherein the second plurality of switching circuits are coupled in parallel with the first plurality of switching circuits to provide the output voltage.

15. The control method of claim 14, further comprising:

coupling to the additional switching converter through a first communication bus to synchronize information between the multiphase switching converter and the additional switching converter; and coupling to a system controller to receive a system control command to control circuit parameters of the multiphase switching converter.

16. The control method of claim 15, further comprising: providing a first data through the first communication bus, and wherein the first data indicates currents flowing through the first plurality of switching circuits.

17. The control method of claim 15, further comprising: receiving a first data through the first communication bus to regulate currents flowing through the first plurality of switching circuits.

18. The control method of claim 15, further comprising:
providing or receiving a second data through the first communication bus; wherein
the second data is used to set an initial ON time period of each of the first plurality of switching circuits and the second plurality of switching circuits.

19. The control method of claim 14, further comprising:
receiving a plurality of current sense signals representative of a current flowing through the first plurality of switching circuits via a plurality of current sense pins; and coupling a total current pin to the additional switching converter providing a total current sense signal representative of a total current flowing through the first plurality of switching circuits at the total current pin based on the plurality of current sense signals; wherein
the turn-on control signal is provided further based on the signal on the total current pin.

* * * * *